United States Patent

Jones et al.

Patent Number: 5,903,558
Date of Patent: May 11, 1999

[54] METHOD AND SYSTEM FOR MAINTAINING A GUARANTEED QUALITY OF SERVICE IN DATA TRANSFERS WITHIN A COMMUNICATIONS SYSTEM

[75] Inventors: Wesley Stuart Jones, Schaumburg; Douglas J. Newlin, Winfield, both of Ill.

[73] Assignee: Motorola, Inc., Schaumburg, Ill.

[21] Appl. No.: 08/672,709

[22] Filed: Jun. 28, 1996

[51] Int. Cl.$^6$ .................................................. H04J 3/16
[52] U.S. Cl. .................... 370/351; 370/230; 370/238; 370/352; 370/353
[58] Field of Search ..................................... 370/230, 238, 370/351, 353, 352, 498

[56] References Cited

U.S. PATENT DOCUMENTS

| | | |
|---|---|---|
| 4,996,685 | 2/1991 | Farese et al. ........................... 370/58.1 |
| 5,446,730 | 8/1995 | Lee et al. ................................. 370/54 |
| 5,586,121 | 12/1996 | Moura et al. ........................... 370/404 |

*Primary Examiner*—Jeffery A. Hofsass
*Assistant Examiner*—Rafael A. Perez-Pineiro
*Attorney, Agent, or Firm*—Hugh C. Dunlop

[57] ABSTRACT

A cable telephony system (100) including a plurality of subscriber units (104) connected to a head-end (102) by a cable distribution network (106) in which upstream and downstream data transmissions are sent between subscribers (104) and head-end (102). Both shared and unshared connections are supported within cable telephony system (100). Transmission between a subscriber (104) and head-end (102) may involve both a shared and unshared connection in which unshared connections are employed to provide a higher quality of service when the shared connection is unable to do so.

8 Claims, 7 Drawing Sheets

FIG.1 —PRIOR ART—

METHOD AND SYSTEM FOR MAINTAINING A GUARANTEED QUALITY OF SERVICE IN DATA TRANSFERS WITHIN A COMMUNICATIONS SYSTEM

FIELD OF THE INVENTION

The present invention relates generally to communications systems, and in particular to an improved cable communications system. Still more particularly, the present invention relates to an improved method and apparatus for data transfer within a cable communications systems.

BACKGROUND OF THE INVENTION

In communications systems, such as a cable communications system, different types of data transfers require different quality of service (QoS), such as delay, bit error rate, and throughput, to transfer data properly to a user's specification. Data transfers within communications systems are typically provided through data streams contained in data packets originating from a number of source communication units (head-end) to a number of destination communication units. Some presently available systems may add integrated services digital network (ISDN) connections to support data traffic in the event of congestion, but these types of connections still carry packetized data from a number of different connections. Other prior art approaches, such as radio frequency (RF) cable modem systems, employ high speed downstream modem technology (e.g., 64 QAM) with simple analog upstream technology (e.g., FSK). This type of system always uses a dedicated circuit-switch connection in the upstream. Such a set up introduces inefficiencies of always remaining in the circuit domain when a packetized connection can be more economical (e.g., in bursty traffic situations). Such a system provides a set upstream traffic capacity and does not address situations in which a greater QoS is required.

Moderate upstream systems also exist. These systems typically employ a shared packet connection. Whereas these moderate speed upstream systems address some of the inefficiencies of always remaining in the circuit domain, they are unable to guarantee a QoS as required by a user. Often times, the QoS data transfer in one direction is inferior (e.g., a lower throughput or a higher bit error rate) to the QoS in the other direction. The result is an unsatisfactory QoS in one direction. Therefore, it would be advantageous to have an improved method and apparatus to efficiently transfer data in a communications system with a high QoS in both directions of data transfer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention provides a communications system in which both shared connections and unshared connections are supported by a distribution network. In a communications system, shared connections are connections for transmitting data in which data packet units being transmitted between two communications units are intermixed with data packet units being transmitted by other communications units in the same connection, such as, for example, packet switching using a packetized data connection. An unshared connection is a data connection dedicated between two communications units in which data being transferred between the communications units are not intermixed with other data, such as, for example, circuit switching using a dedicated circuit-switch connection.

According to the present invention, downstream data transmissions from a primary communications unit to a secondary or subscriber communications unit may be either a shared or unshared connection while upstream data transmissions from the subscriber or secondary communications units may be sent to the primary communications unit using either shared or unshared connections independent of the type of connection in the downstream direction according to the present invention.

Data transmissions using a shared connection in either the upstream or downstream direction may be switched to an unshared connection in response to detecting a condition in which the quality of service provided by the connection falls below a threshold level required to maintain a quality of service criteria. The connection may be switched from a shared to an unshared connection in one direction while maintaining the original shared connection in the other direction according to the present invention. When conditions permit, the unshared connection may be switched back to a shared connection according to the present invention.

Figure 1:
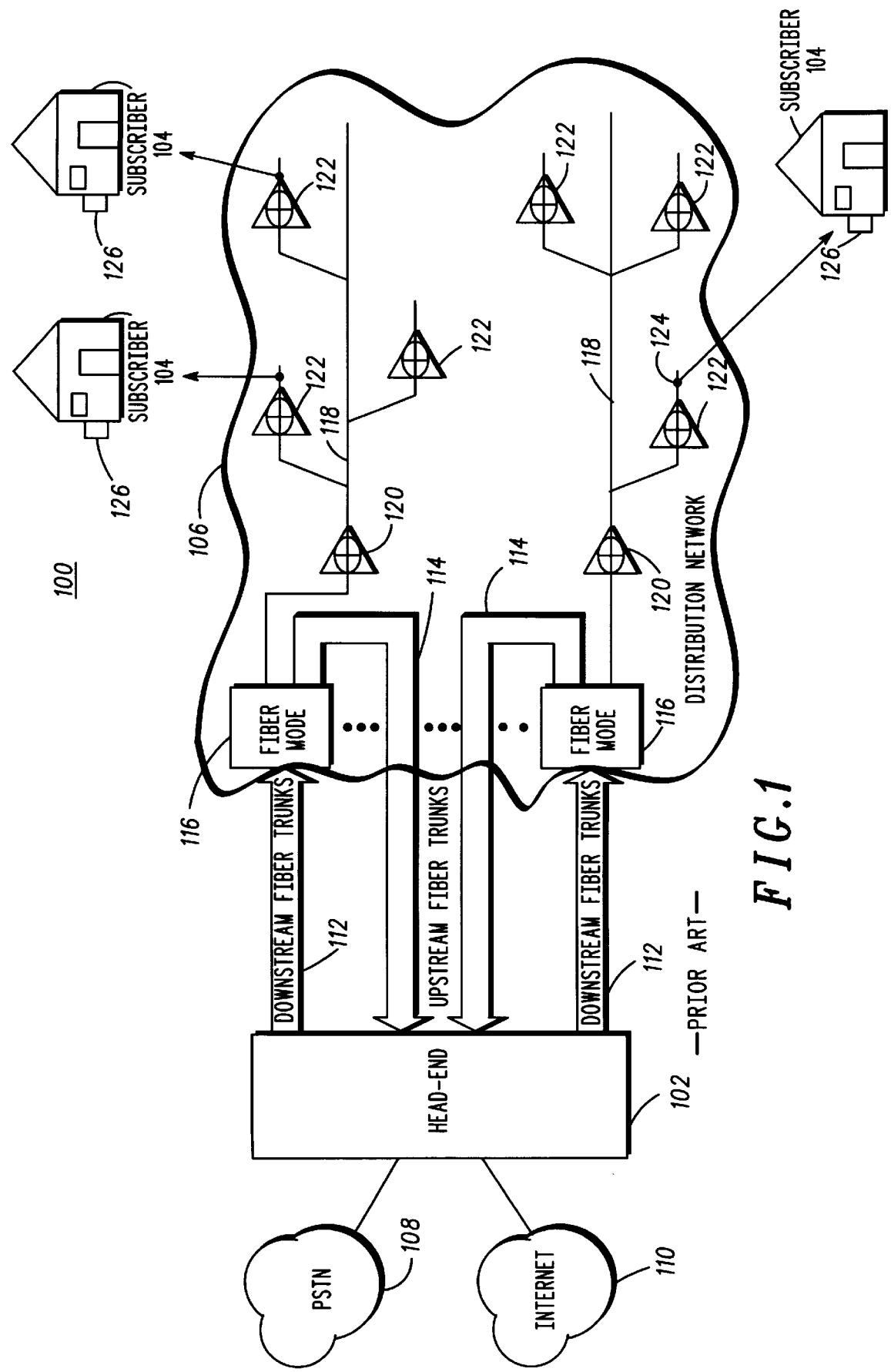
FIG. 1 is a diagram of a communications system in which the present invention may be implemented.

With reference now to the figures, and in particular with reference to FIG. 1, a diagram of a communications system 100 is illustrated in which the present invention may be implemented. Communications system 100 is an example of a basic cable system architecture that is a hybrid cable system using a combination of fiber and coaxial cable to distribute subscriber services to customer premises equipment. Alternatively, communications system 100 may consist entirely of coaxial cable. Regardless of the cable infrastructure, a cable branch within communications system 100 will serve a distribution area shared by a community of subscribers. In the depicted example, communications system 100 is a cable telephony communications system that provides telephone services and data transmission services along with cable television services on a coaxial fiber-optic cable television infrastructure.

Communications system 100 includes a head-end 102 that is connected to subscribers 104 by a distribution network 106. Head-end 102 generates downstream carrier channels in communications system 100 and provides video and a connection for telephone and data transmissions. In particular, head-end 102 is connected to public switching telephone network (PSTN) 108 and Internet 110. Equipment at head-end 102 is responsible for providing access and management of services to subscribers within communications system 100.

Transmissions from head-end 102 sent to distribution network 106 are facilitated by downstream fiber trunks 112 and upstream fiber trunks 114. These fiber trunks are fiber optic cables and are connected to fiber nodes 116. Fiber nodes 116 perform directional conversion between the optical domain of fiber optical cables and the electrical domain of coaxial cables in distribution network 106. Each fiber node 116 has a connection to at least one cable branch 118. In the depicted example, cable branch 118 is comprised of coaxial cable and includes trunk amplifiers 120, which are bi-directional amplifiers. Additionally, bi-directional line extenders 122 are located near taps 124, which are connected to cable access units (CAUs) 126 located at subscribers 104. These CAUs are also called "communications units" or "subscriber units". Each cable branch 118 includes one or more serving areas.

Head-end 102 is used to provide telephony, integrated services digital network (ISDN) services, digital video, interactive video, or interactive multimedia within communications system 100. Additionally, head-end 102 controls the cable spectrum, infrastructure resources, and services for all CAUs in a serving area, and manages multiple serving areas. CAUs 126 provide telephone, ISDN, digital video, interactive video, interactive multimedia, and television services at subscriber premises. Typically, a CAU is mounted on the side of the subscriber's home, or in an unobtrusive place, such as a basement or attic. The CAU manages the upstream and downstream communication paths from and to the subscriber's premise and transports cable television channels to the subscriber's television.

According to the present invention, communications system 100 divides up the radio frequency (RF) spectrum for use with multiple subscribers such that no individual subscriber has a dedicated frequency range. The spectrum allocated for service within a single cable branch may be used again for a different group of subscribers in every cable branch of distribution network 106. A different portion of the spectrum may be allocated for upstream communications and downstream communications. The spectrums are divided into channels within these uplink and downlink allocations.

Communications system 100 is divided up into areas with separate signal paths in which the RF spectrum allocated 15 for the cable telephony service may be used again for a different group of subscribers in each separate cable branch of the distribution network 106. In the downstream spectrum, a large number of conventional television channels (for example 80 channels, each 6 MHz in width) are conveyed to cable television subscribers. In the reverse, in the uplink spectrum, other communications are provided. A portion of the downstream spectrum and a portion of the uplink spectrum are dedicated to a plurality of trunked traffic channels serving a large number of subscribers having telephone and/or other two way service. Within these dedicated spectrum allocations, a number of RF channels are deployed. These RF channels are spaced 600 KHz apart and each channel contains 8 digitally encoded time division multiplexed information bearing channels. Active channels are operated in pairs with each one in the uplink segment of the allocation associated with one each in the downlink segments. This association provides for frequency division duplex (FDD) operations. In addition, communications system 100 provides for time division multiplexing (TDM) in which a number of channels are derived from the transmission medium by dividing the access to the medium into sequential "time slots". The cable communications system provides for time division multiplexing (TDM) in the downstream to transmit information to users. Time division multiple access (TDMA) is used to provide multiple access to users to send data upstream within communications system 100.

Upstream and downstream data transmissions sent between two communications units may involve an unshared connection in one direction and a shared connection in the other direction with both connections using the same type of physical media (distribution network 106) to transport data between the communications units.

Data sent downstream from head-end 102 to fiber nodes 116 are typically sent using shared connections (e.g., packetized data connections) at about 10 megabits per second (Mbs) using various methods, such as 64 QAM modulation on a non-channelized (e.g., 2 MHz wide) portion of the spectrum. Shared connections involving packetized data involve data packet units being sent between two communications units in which the data packet units are multiplexed with other data packet units being sent between other communications units in the same connection. Upstream data transmissions from fiber nodes 116 are typically at 768 Kilobits per second (Kbps) using techniques, such as $\pi/4$ DQPSK transmissions, without using TDM. ISDN transmissions are provided to CAUs in downstream transmissions using TDM and in upstream transmissions using TDMA according to the present invention. The ISDN transmissions provide N*64 Kbps transmissions depending on the needs at the user end. These ISDN connections are unshared connections (e.g., dedicated circuit switched connections) according to the present invention.

Figure 2:
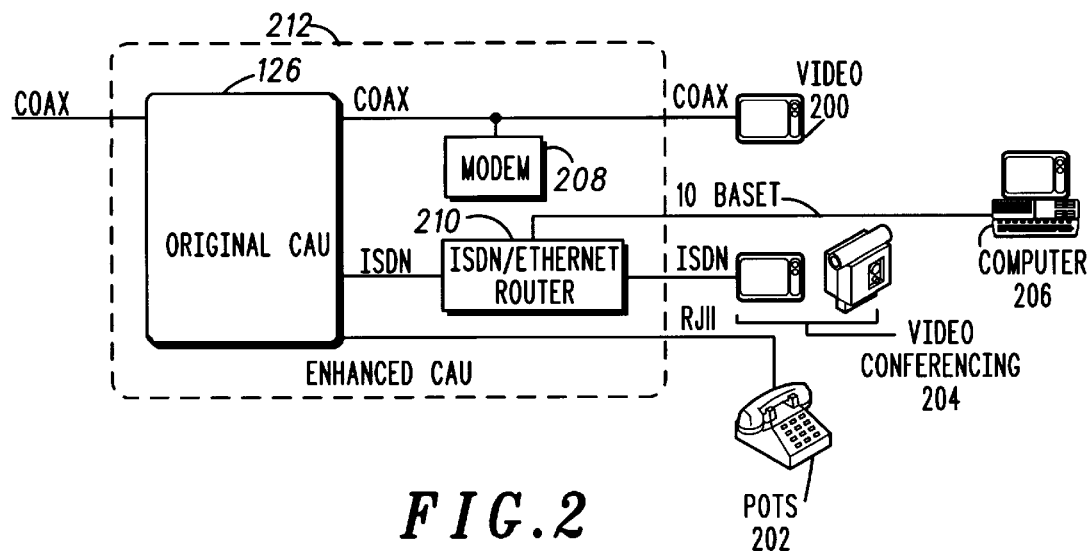
FIG. 2 is a diagram of a cable access unit (CAU) according to a preferred embodiment of the present invention.

With reference now to FIG. 2, a diagram of a cable access unit is depicted according to the present invention. CAU 126 includes a coaxial input from its connection to a tap 124 (FIG. 1). CAU 126 also includes a coaxial connection to video 200, which may be a television within the subscriber premises. CAU 126 includes a connection to a standard telephone 202 through an RJ11 connection and provides an ISDN connection to equipment, such as video conferencing equipment 204 and a 10baseT connection to a computer 206. The 10baseT connection includes a modem unit 208, which provides a connection to the coaxial cable to CAU 126. Router 210 provides an alternative data path for computer 206 when upstream data transmissions or downstream data transmissions require a higher quality of service than provided through the coaxial cable connection. CAU 126, modem 208, and ISDN-ethernet router 210 may be combined to form an enhanced CAU 212 device according to the present invention.

The quality of service required may be defined through various performance parameters, such as, for example, delay, bit error rate, and throughput. Additionally, the quality of service may include other parameters, such as, for example, whether security is required, which would require the use of a unshared connection in the form of a dedicated circuit-switched connection according to the present invention. Security may be required in various situations, such as making electronic purchases on the Internet where credit card information would be delivered on a more reliable and secure circuit switch connection. Thereafter, the quality of service could then drop to allow for normal shared connections, such as a shared packet connection according to the present invention. Router 210 is transparent to the nodes on the ethernet network and simply routes traffic, such as upstream traffic across the ISDN network when the thresholds for the quality of service for a packet data connection have been reached. Of course, other parameters than the listed examples may be used for defining the quality of service according to the present invention.

It is possible to configure a CAU so that either or both modem 208 and router 210 are placed external to the CAU. Additionally, it is possible to integrate both functions within the CAU, as with enhanced CAU 212. Router 210 is illustrated as a function provided according to the present invention and does not imply or necessitate a separate physical implementation from CAU 126. Additionally, router 210 does not prevent other ISDN compatible hardware or software applications, such as the hardware and software implemented in video conferencing equipment 204 from utilizing the ISDN link available through CAU 126 according to the present invention. Similar routing techniques are used at head-end 102 in communications system 100 to route downstream traffic across the ISDN network.

Figure 3:
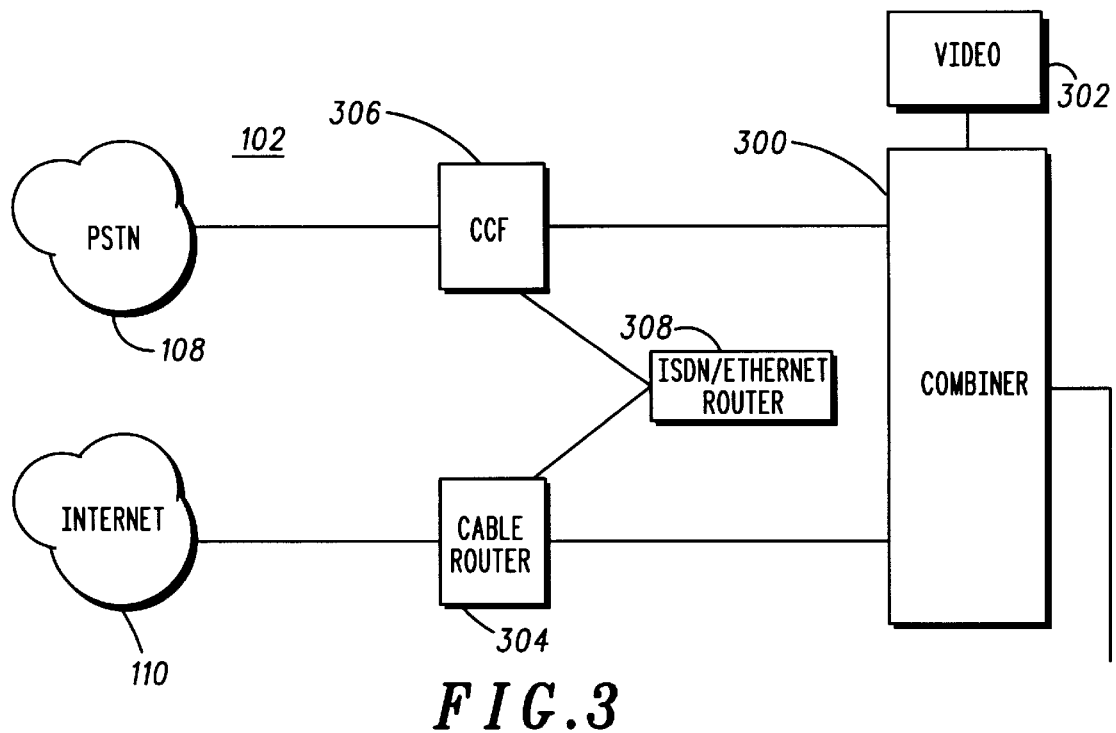
FIG. 3 is a block diagram of a head-end according to a preferred embodiment of the present invention.

With reference now to FIG. 3, a block diagram of head-end 102 is depicted according to the present invention. Head-end 102 includes a combiner 300, which provides a connection to distribution network 106. Combiner 300 has an input for video sources 302. Additionally, combiner 300 has an input connected to cable router 304 and another input connected to cable control frame (CCF) 306 according to the present invention. Combiner 300 has its outputs connected to upstream and downstream fiber trunks. Cable router 304 provides a connection to other data systems, such as the internet 110 while cable control frame 306 provides a connection to PSTN 108. Router 308 provides for hybrid packet/circuit connections within communications system 100. As with router 210 in FIG. 2, router 308 is illustrated as a function provided according to the present invention and does not imply or necessitate a separate physical implementation within head-end 102. Router 308 hides the hybrid nature of the connections from various destination sites, such as a world wide web site in internet 110. For example, router 308 hides the hybrid nature of a data connection with a CAU that has a packet-based downstream connection, also called a "shared connection" and a circuit upstream connection, also called an "unshared connection", within communications system 100. A corresponding change from the circuit connection back to the packet domain before the data leaves communications system 100 for the destination within internet 110 is made such that the destination sees the packet connection in both directions and is shielded from having to account for the mechanism provided within communications system 100 according to the present invention.

Hybrid connections will still remain in a hybrid state if the destination supports such a hybrid connection. For example, if a CAU's upstream connection remains in a circuit-switched state all the way to the destination within Internet 110 with the downstream connection remaining in the packet domain, no change would be made according to the present invention. Thus, the present invention supports both types of end-to-end-calls (i.e., packet-only/circuit-only or hybrid: packet circuit).

Figure 4:
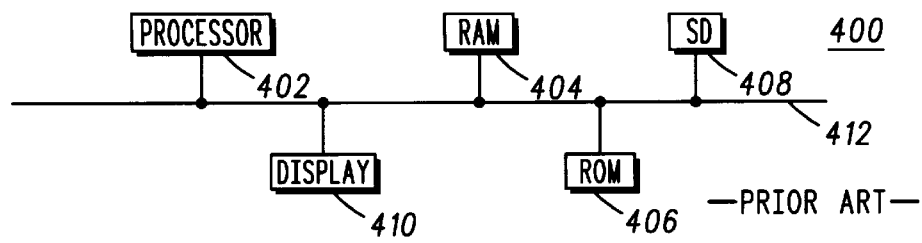
FIG. 4 is a block diagram of a data processing system, that may be employed to implement a router in either a head-end or a CAU according to the present invention.

With reference now to FIG. 4, a block diagram of a data processing system that may be employed to implement a router in either head-end 102 or at a CAU 126 is depicted according to the present invention. At head-end 102 and at CAU 126, the routing function may be implemented using data processing system 400, which includes processor 402, random access memory (RAM) 404, read only memory (ROM) 406, storage device (SD) 408, and display device 410, all connected by bus 412 according to the present invention. One having ordinary skill in the art will recognize that the elements of data processing system 400 are conventional and operate in a conventional manner. Router 210 in FIG. 2 and router 308 in FIG. 3 use some or all of the components depicted in FIG. 4 according to the present invention. Alternatively, the functions provided by router 210 or router 308 may be implemented in an application specific integrated circuit (ASIC) according to the present invention. Data processing system 400 may be implemented using a number of data processing systems, such as a personal computer, a work station, or a main frame computer system.

Figure 5:
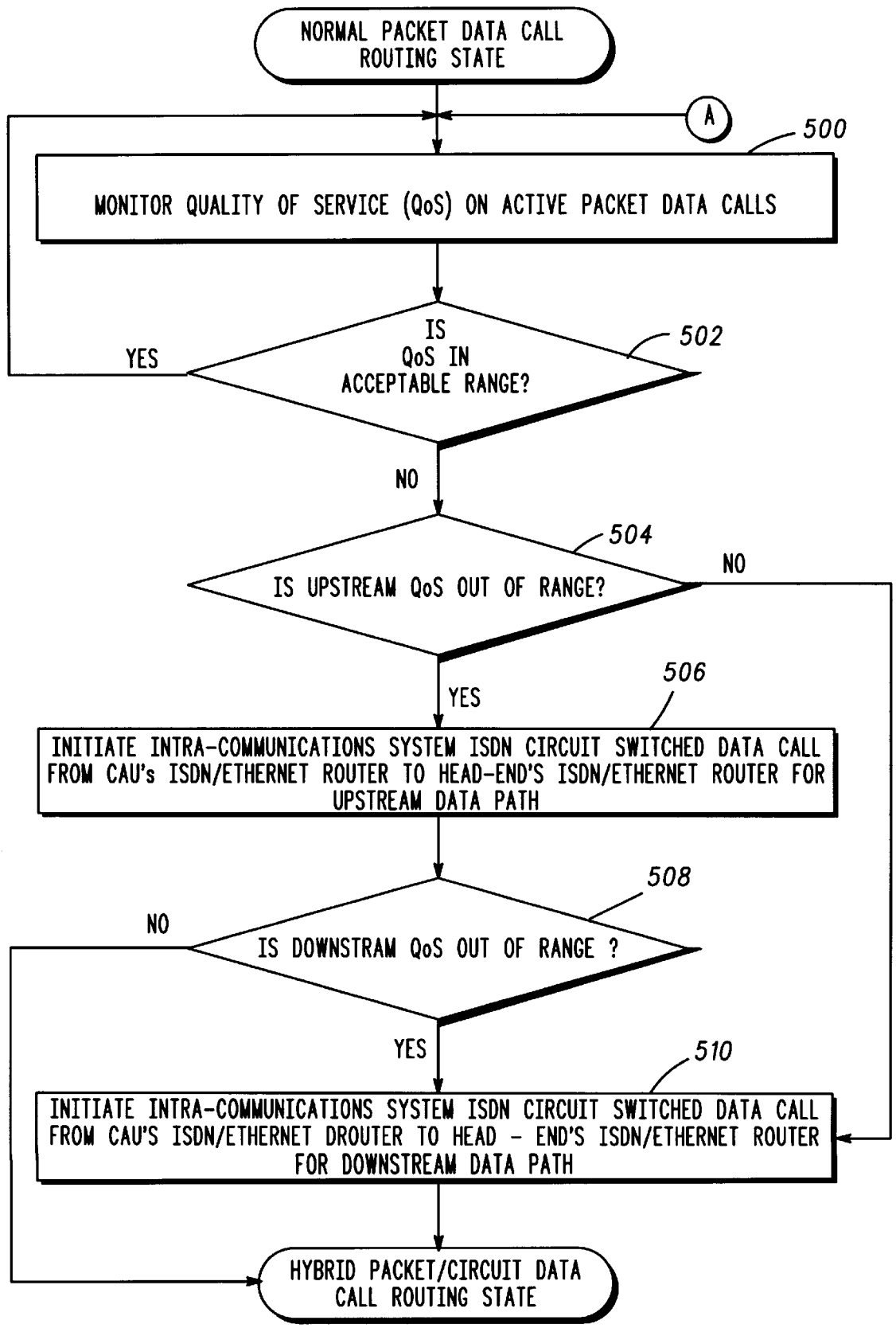
FIG. 5 is a flowchart of a process for a normal packet data call routing state according to the present invention.

With reference now to FIG. 5, a flowchart of a process for a normal packet data call routing state is depicted according to the present invention. The normal packet data call routing state involves shared connections in both upstream and downstream directions according to the present invention. The process begins by monitoring the quality of service (QoS) on active packet data calls (step 500). Thereafter, a determination is made as to whether the QoS is within an acceptable range (step 502). If the QoS is within an acceptable range, the process returns to step 500 to continue to monitor active packet data calls. Otherwise, the process determines whether the upstream QoS is out of the acceptable range (step 504). If the upstream QoS is out of the acceptable range, the process then initiates intra-communications system ISDN circuit switched data call from CAU's ISDN/ethernet router to the head-end's ISDN/ethernet router to switch the data call from a shared connection to an unshared connection for the upstream data path according to the present invention (step 506).

Figure 6:
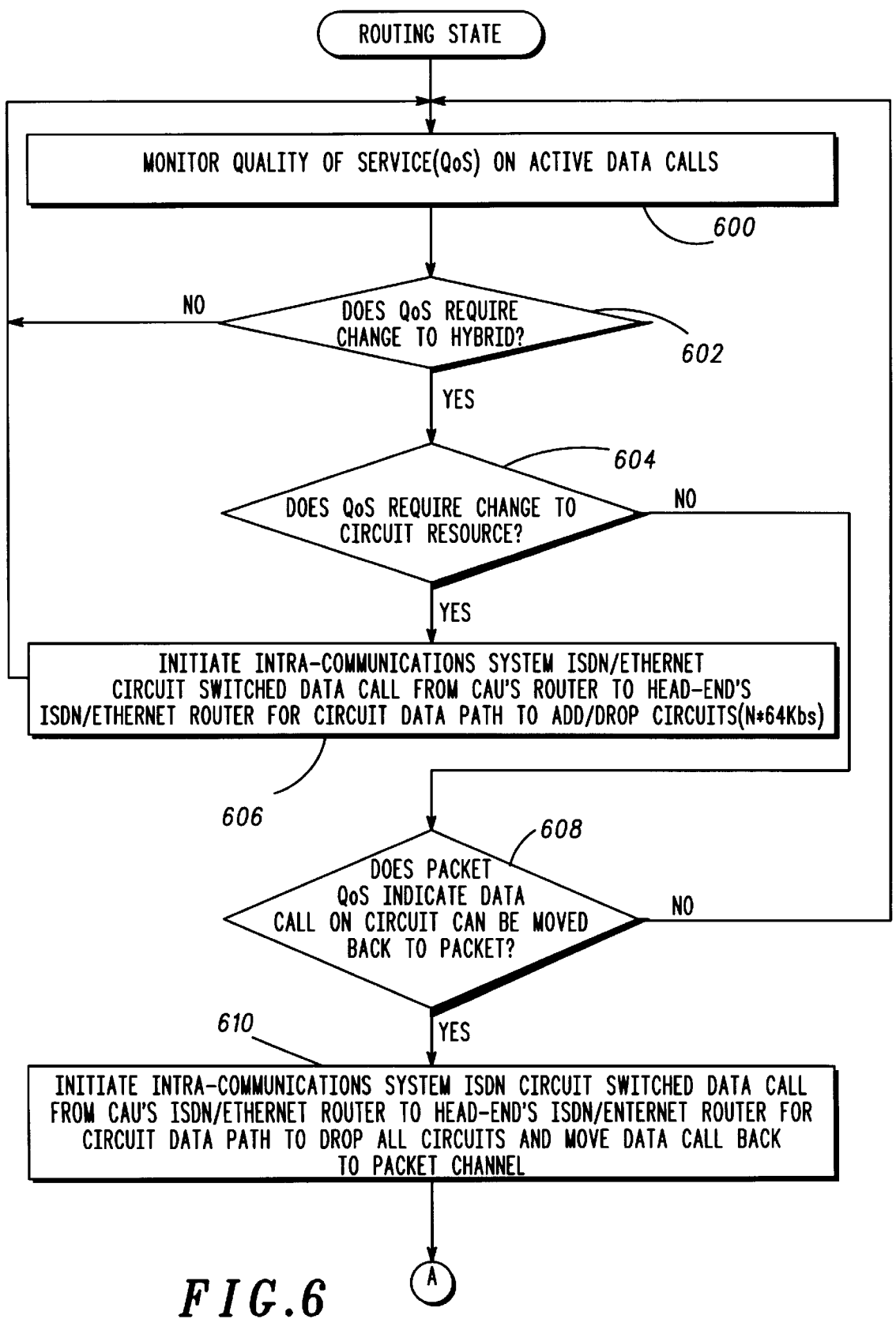
FIG. 6 is a flowchart of a process illustrating a hybrid packet/circuit data call routing state according to the present invention.

The process then determines whether the downstream QoS is out of range (step 508). If the downstream QoS is out of range, the process then initiates intra-communications system ISDN circuit switched data call from the CAU's ISDN/ethernet router to the head-end's ISDN/ethernet router for the downstream data path to switch the downstream portion of the call from a shared connection to an unshared connection (step 510). The process also proceeds to step 510 from step 504 if the upstream QoS is not out of range. From step 510, the process proceeds to a hybrid packet/circuit data call routing state as depicted in FIG. 6. With reference again to step 508, if the downstream QoS is not out of range, the process then proceeds to the hybrid packet/circuit data call routing state. The hybrid packet/circuit data call routing state involves a shared connection in one direction and an unshared connection in another direction. Additionally, in the depicted example, the hybrid packet/circuit data call routing state also may include unshared connections in both the upstream and downstream directions according to the present invention.

With reference now to FIG. 6, a flowchart of a process illustrating a hybrid packet/circuit data call routing state is depicted according to the present invention. The process monitors the QoS on active data calls (step 600). A determination is made as to whether QoS requires a change to the hybrid packet/circuit data call routing state (step 602). If the answer is no, the process returns to step 600 as described above. Otherwise, the process determines whether the QoS requires a change to circuit resources (step 604). If the process does require a change to circuit (unshared)

resources, the process then initiates intra-communications system ISDN circuit switched data call from the CAU's ISDN/ethernet router to the head-end's ISDN/ethernet router for a circuit data path to add or drop circuits (N*64 Kbps) depending on the need to increase or decrease the capacity of the unshared connection (step 606) with the process returning thereafter to the beginning of the hybrid packet circuit data call routing state in FIG. 6. According to the present invention, the capacity may be increased or decreased by adding or subtracting time slots assigned to an unshared connection.

With reference again to step 604, if a change in circuit resources is not required, a determination is then made as to whether the packet QoS indicates a data call on the circuit can be moved back to the packet domain (step 608). If the answer is yes, the process initiates (step 610) intra-communications system ISDN circuit switched data call from the CAU's ISDN/ethernet router to the head-end's ISDN/ethernet router for the circuit data path to drop all circuits and move the data call back to the packet channel (shared connection) with the process then returning to the hybrid packet/circuit data call routing state as depicted above. With reference again to step 608, if the QoS does not indicate that the circuit can be moved back to a packet call, the process also returns to step 600.

According to the present invention, a connection including both an unshared connection and a shared connection (e.g., a hybrid packet/circuit connection) may be returned to a shared connection in both the upstream and downstream state once the quality of service thresholds are met again. Such a return may be accomplished through various intelligent approaches, such as hysteresis (e.g., delay through aging) so that the change from shared to unshared connection and from a unshared to shared connection does not "ping-pong" as the quality of threshold crosses above and below threshold points according to the present invention.

Figure 7:
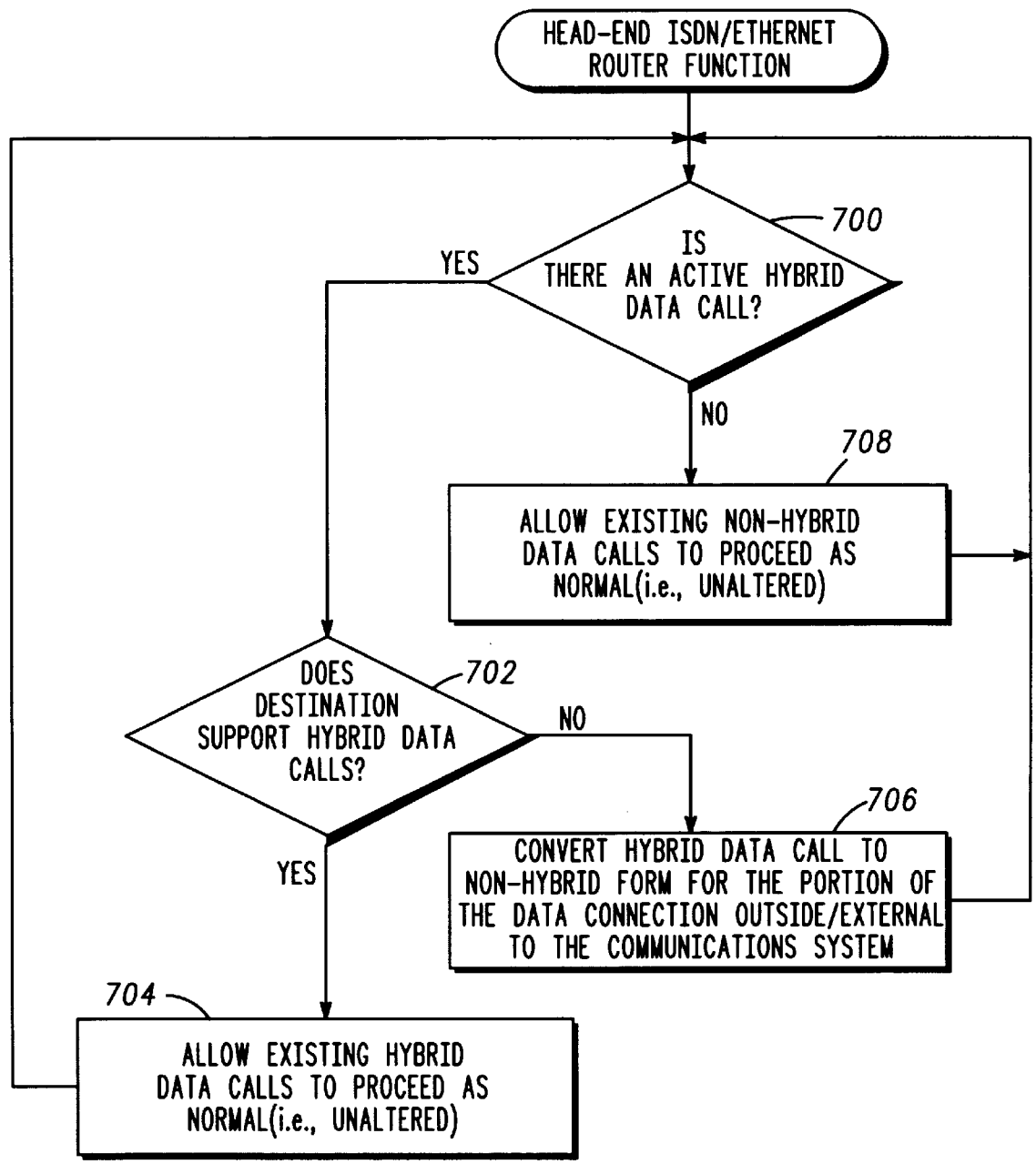
FIG. 7 is a flowchart of a process for a head-end ISDN/ethernet routing function according to the present invention.

With reference now to FIG. 7, a flowchart of a process for a head-end ISDN/ethernet routing function is depicted according to the present invention. The process begins by determining whether an active hybrid data call is present (step 700). If an active hybrid data call is present, the process then determines whether the destination supports hybrid data calls (step 702). If hybrid data calls are supported at the destination, the process then allows existing hybrid data calls to proceed as normal (i.e., unaltered) (step 704). The process then returns to step 700, the beginning of the head-end ISDN/ethernet router function.

With reference again to step 702, if the destination does not support hybrid data calls, the process then converts the hybrid data call to a non-hybrid form for any portion of the data connection outside or external to the communications system (step 706). The portion of the data connection internal to the communications system remains in its hybrid form. The process then returns to step 700 as previously shown. With reference again to step 700, if an active hybrid data call is not present, the existing non-hybrid data calls proceed as normal (i.e., unaltered) (step 708).

Figure 8:
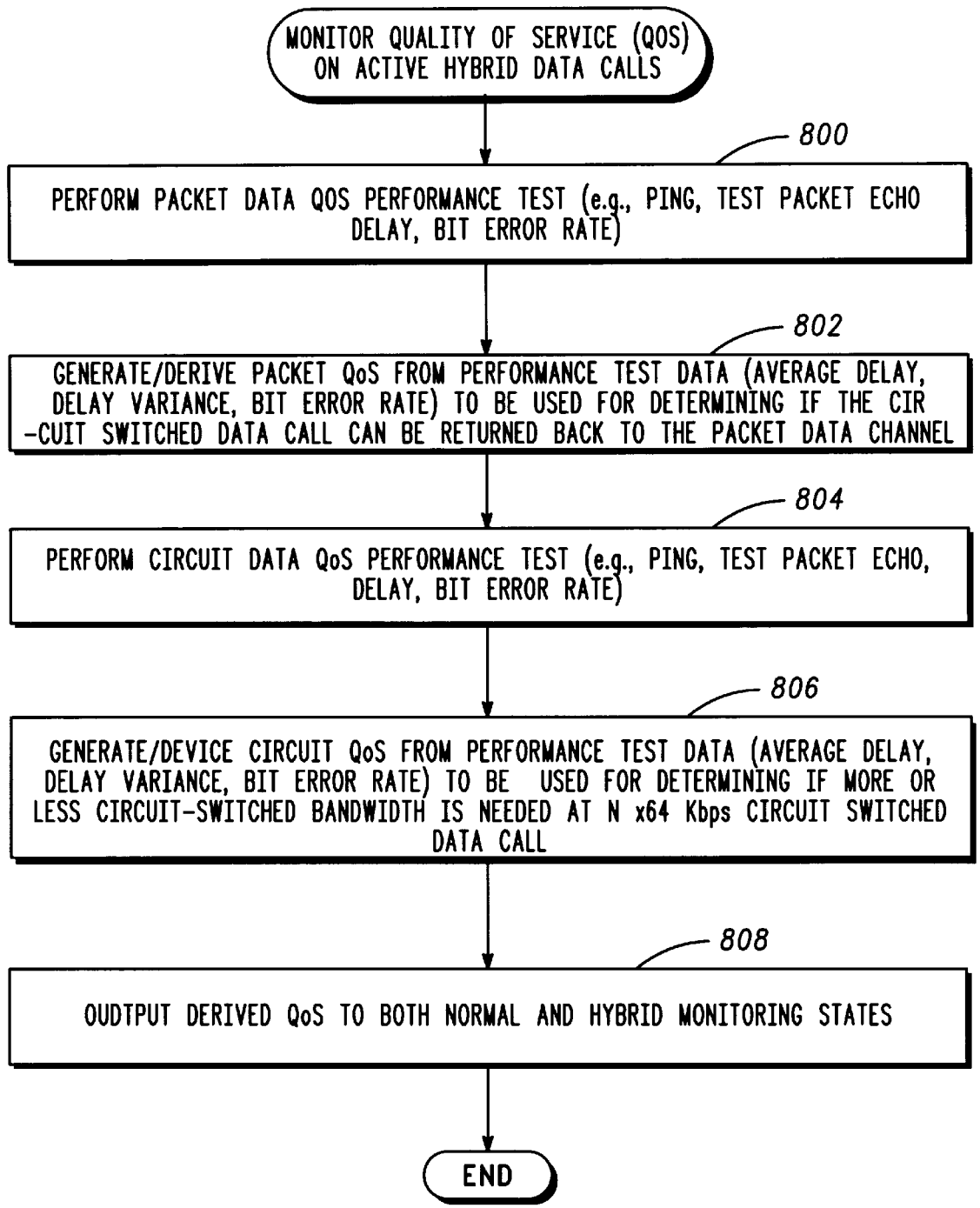
FIG. 8 is a flowchart of a process for monitoring the quality of service (QoS) on active hybrid data calls according to the present invention.

With reference now to FIG. 8, a flowchart of a process for monitoring the QoS on active hybrid data calls is depicted according to the present invention. The process begins by performing a packet data QoS performance test, which may include, for example, a ping test, testing for packet echoes, delay, and bit error rates (step 800). Thereafter, the packet QoS is derived from the performance test data for use in determining if the circuit switch data call can be returned back to the packet data channel (step 802). The performance test data derived may include average delay, delay variance, and bit error rates. A circuit data QoS performance test also is performed for circuit data (step 804). The circuit QoS is derived from the performance test data including, for example, average delay, delay variance, and bit error rate (step 806). This performance test data is used to determine if more or less circuit switched bandwidth is required at N*64 Kbps circuit switch data calls (step 806). Thereafter, the QoS derived for both normal and hybrid monitoring states is output (step 808).

Figure 9:
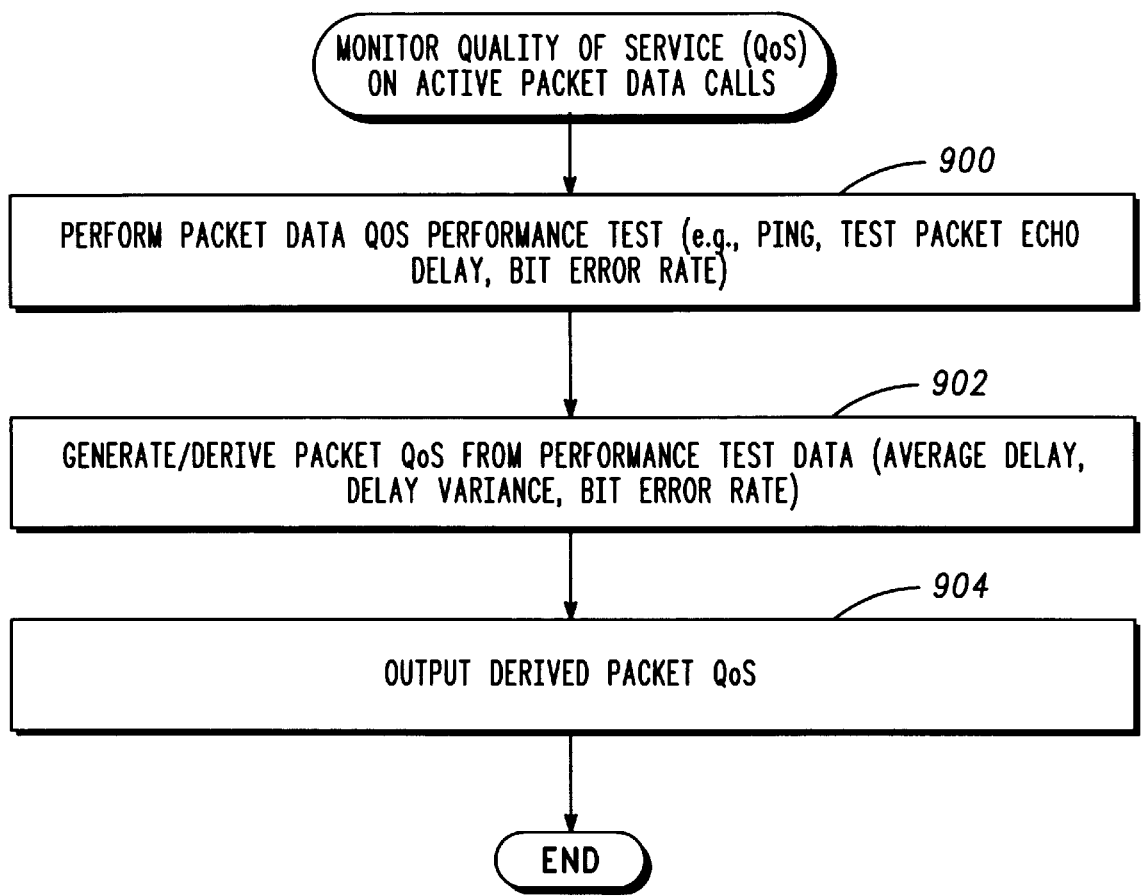
FIG. 9 is a flowchart of a process for monitoring the QoS on active packet data calls according to the present invention.

With reference now to FIG. 9, a flowchart of a process for monitoring the QoS on active packet data calls is depicted according to the present invention. The process begins by performing a packet data QoS performance test (step 900). Thereafter, the packet QoS is derived from the performance test data to determine indicators, such as average delay, delay variance, and bit error rate (step 902). The packet QoS is then output (step 904).

Referring again to FIG. 4, instructions for controlling the routing of upstream and downstream calls may be stored within RAM 404, ROM 406, or in storage device 408 according to the present invention. These instructions are executed by a processor, such as processor 402 in response to the storage device being connected to the processor according to the present invention. The process depicted in FIGS. 5–9 may be implemented as instructions according to the present invention.

Although the depicted examples show CAUs and the head-end as communications units, other communications units other than the head-end and CAUs may be employed using the processes and the apparatus of the present invention.

As can be seen from the description above, the present invention introduces a hybrid packet/circuit connection including both shared and unshared connections to meet a user defined QoS threshold. For example, if a user has a packet connection in both the upstream and downstream direction within a communications system and the upstream QoS degrades below a defined threshold (e.g., due to lower bandwidth available in the upstream, such as 768 Kbps versus the downstream 10 Mbps) and a high packet traffic level on the shared upstream packet channel, the present invention automatically moves the data call in the upstream direction only from the congested upstream packet connection to a dedicated circuit switch upstream connection (an unshared connection) such as an ISDN N * 64 Kbps call, preserving the user's QoS requirements. The same is performed for downstream connections to the user if the downstream QoS degrades below a defined threshold.

As can readily be recognized, the steps and method of the present invention may be stored upon any article of manufacture used to store a method or procedure including a program storage device such as a diskette or computer hard drive.

Thus, the present invention provides an improved method and apparatus for maintaining a QoS for a user without over committing resources with the communications system. The present invention provides the advantage of changing the type of connection only in the upstream or downstream direction, or both directions depending on whether the connection in one direction fails to meet the QoS threshold defined by the user. Thus, the presently claimed invention provides for the use of both shared and unshared connections for data transmission between two communications units through the same physical medium, but through different types of data transmission, While the invention has been particularly shown and described with reference to a preferred embodiment, it will be understood by those skilled in the art that various changes in form and detail may be made therein without departing from the spirit and scope of the invention.

What is claimed is:

1. A device comprising:

a cable access unit at a premises providing a connection between a distribution network and the premises:

a router coupled to the cable access unit at the premises, the router providing first and second independently established alternate data paths over a common cable to and from the distribution network including:

a first path sending downstream data transmissions through a shared connection and sending upstream data transmissions through a shared connection;

a second path sending downstream data transmissions through a shared connection and sending upstream data transmissions through an unshared connection wherein the unshared connection is established and disconnected while the shared connection persists; and wherein the router routes at least the upstream data transmissions selectively to one of the first and second data paths in response to an at least one quality of service criterion.

2. The device of claim 1 wherein the router provides an alternate data path of sending downstream data transmissions through an unshared connection and sending upstream data transmissions through a shared connection.

3. The device of claim 1 wherein the router provides an alternate data path of sending downstream data transmissions through an unshared connection and sending upstream data transmissions through an unshared connection.

4. A method in a communications system comprising:

monitoring a quality of data transmissions between subscriber units and a head end on a shared connection in the communications system;

shifting a first portion of the data transmissions to an unshared connection in response to a condition indicating that the shared connection is insufficient for the portion of the data transmission while continuing transmitting a second portion over the shared connection; and shifting the first portion of the data transmissions back to the shared connection in response to a condition indicating that the shared connection is sufficient for the portion of the data transmissions.

5. The method of claim 4, wherein the step of shifting a portion of the data transmissions to an unshared connection in response to a condition indicating that the shared connection is insufficient for the portion of the data transmissions comprises shifting upstream data transmissions to the unshared connection in response to the condition indicating that the shared connection is insufficient for the upstream data transmissions.

6. An article of manufacture having stored thereon the steps of:

determine that at least one of a number of shared connections in a communications system having an electronic memory and carrying packet data is unable to allow transmission of a first portion of data packets units and a second portion of data packet units within an at least one quality of service criterion;

transmit the first portion of data packet units and the second portion of data packet units along an unshared connection until the at least one of a number of shared connections is able to allow transmission of the data packet units within the at least one quality of service criterion; and transmit the second portion of data packet units along the at least one of a number of shared connections.

7. A method comprising the steps of:

determining that at least one of a number of shared connections in a communications system over a common cable carrying a first portion of packet data units and a second portion of packet data units is unable to allow transmission of data packet units within an at least one quality of service criterion;

transmitting the first portion of packet data units and a second portion of data packet units along an unshared connection until the at least one of a number of shared connections is able to allow transmission of the data packet units within the at least one quality of service criterion; and transmitting at least the first portion of the data packet units along the at least one of a number of shared connections.

8. A system comprising:

a number of shared connections in a communications system carrying packet data between at least one subscriber unit and a head-end over a common cable; and a router located at subscriber unit coupled to the number of shared connections, wherein if the router determines that at least one of the number of shared connections is unable to allow transmission of data packet units within an at least one of a quality of service criterion, the router selectively transmits the data packet units along an unshared connection until the at least one of the number of shared connections is able to allow transmission of the data packet units within the quality of service criteria, and then transmits the data packet units along the at least one of the number of shared connections.

* * * * *